US012346556B2

United States Patent
Dodov

(10) Patent No.: US 12,346,556 B2
(45) Date of Patent: Jul. 1, 2025

(54) INFORMATION PROCESSING DEVICE AND INFORMATION PROCESSING METHOD

(71) Applicant: Wacom Co., Ltd., Saitama (JP)

(72) Inventor: Lachezar Sashov Dodov, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/519,732

(22) Filed: Nov. 27, 2023

(65) Prior Publication Data
US 2024/0094898 A1    Mar. 21, 2024

Related U.S. Application Data

(63) Continuation of application No. 18/055,305, filed on Nov. 14, 2022, now Pat. No. 11,829,598, which is a continuation of application No. PCT/JP2021/006779, filed on Feb. 24, 2021.

(30) Foreign Application Priority Data

Jun. 15, 2020   (JP) ................................. 2020-102929

(51) Int. Cl.
    *G06F 3/04883* (2022.01)
(52) U.S. Cl.
    CPC ................................. *G06F 3/04883* (2013.01)
(58) Field of Classification Search
    CPC .................................................. G06F 3/04883
    See application file for complete search history.

(56) References Cited

U.S. PATENT DOCUMENTS

| | | | | |
|---|---|---|---|---|
| 2003/0107558 A1* | 6/2003 | Bryborn | ................. | G06V 10/17 345/179 |
| 2005/0211783 A1* | 9/2005 | Chou | ..................... | G07C 13/00 235/472.03 |
| 2006/0031764 A1 | 2/2006 | Keyser et al. | | |
| 2008/0129711 A1* | 6/2008 | Bergstrom | .......... | G06F 3/03546 345/179 |

(Continued)

FOREIGN PATENT DOCUMENTS

| | | |
|---|---|---|
| JP | 2012-014216 A | 1/2012 |
| JP | 6005880 B1 | 10/2016 |

OTHER PUBLICATIONS

International Search Report, mailed May 18, 2021, for International Application No. PCT/JP2021/006779, 4 pages.

*Primary Examiner* — Seth A Silverman
(74) *Attorney, Agent, or Firm* — Seed IP Law Group LLP

(57) ABSTRACT

An information processing device includes a storage storing handwritten data generated according to handwritten input to a sheet-like recording medium, in a first file corresponding to a first page and a second file corresponding to a second page, and a controller which determines whether or not to couple (combine) the first and second files based on a first identification result identifying a region of the first page in which the handwritten data has been written or a region of the first page in which the handwritten data has not been written and a second identification result identifying a region of the second page in which the handwritten data has been written or a region of the second page in which the handwritten data has not been written. In response to a determination to couple the first and second files, the controller controls coupling of the first and second files.

16 Claims, 13 Drawing Sheets

(56) References Cited

U.S. PATENT DOCUMENTS

| | | |
|---|---|---|
| 2008/0273797 A1* | 11/2008 | Takikawa ............ G06F 3/03545 |
| | | 382/188 |
| 2015/0153997 A1* | 6/2015 | Yoshida ................... G09G 3/20 |
| | | 345/107 |
| 2018/0060291 A1 | 3/2018 | Giffard-Burley |
| 2018/0136746 A1 | 5/2018 | Yokotsuka et al. |
| 2018/0150439 A1 | 5/2018 | Rahman et al. |

\* cited by examiner

FIG. 5A  PAGE #1 (FILE #n)

FIG. 5B  PAGE #2 (FILE #n+1)

FIG. 7

PAGE #1 (FILE #n)

| 001 | 002 | 003 | 004 | 005 | 006 | 007 | 008 | 009 | 010 | 011 | 012 | 013 | 014 | 015 | 016 | 017 |
|---|---|---|---|---|---|---|---|---|---|---|---|---|---|---|---|---|
| 018 | 019 | 020 | 021 | 022 | 023 | 024 | 025 | 026 | 027 | 028 | 029 | 030 | 031 | 032 | 033 | 034 |
| 035 | 036 | 037 | 038 | 039 | 040 | 041 | 042 | 043 | 044 | 045 | 046 | 047 | 048 | 049 | 050 | 051 |
| 052 | 053 | 054 | 055 | 056 | 057 | 058 | 059 | 060 | 061 | 062 | 063 | 064 | 065 | 066 | 067 | 068 |
| 069 | 070 | 071 | 072 | 073 | 074 | 075 | 076 | 077 | 078 | 079 | 080 | 081 | 082 | 083 | 084 | 085 |
| 086 | 087 | 088 | 089 | 090 | 091 | 092 | 093 | 094 | 095 | 096 | 097 | 098 | 099 | 100 | 101 | 102 |
| 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 |
| 137 | 138 | 139 | 140 | 141 | 142 | 143 | 144 | 145 | 146 | 147 | 148 | 149 | 150 | 151 | 152 | 153 |
| 154 | 155 | 156 | 157 | 158 | 159 | 160 | 161 | 162 | 163 | 164 | 165 | 166 | 167 | 168 | 169 | 170 |
| 171 | 172 | 173 | 174 | 175 | 176 | 177 | 178 | 179 | 180 | 181 | 182 | 183 | 184 | 185 | 186 | 187 |
| 188 | 189 | 190 | 191 | 192 | 193 | 194 | 195 | 196 | 197 | 198 | 199 | 200 | 201 | 202 | 203 | 204 |
| 205 | 206 | 207 | 208 | 209 | 210 | 211 | 212 | 213 | 214 | 215 | 216 | 217 | 218 | 219 | 220 | 221 |
| 222 | 223 | 224 | 225 | 226 | 227 | 228 | 229 | 230 | 231 | 232 | 233 | 234 | 235 | 236 | 237 | 238 |
| 239 | 240 | 241 | 242 | 243 | 244 | 245 | 246 | 247 | 248 | 249 | 250 | 251 | 252 | 253 | 254 | 255 |
| 256 | 257 | 258 | 259 | 260 | 261 | 262 | 263 | 264 | 265 | 266 | 267 | 268 | 269 | 270 | 271 | 272 |
| 273 | 274 | 275 | 276 | 277 | 278 | 279 | 280 | 281 | 282 | 283 | 284 | 285 | 286 | 287 | 288 | 289 |
| 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 |
| 324 | 325 | 326 | 327 | 328 | 329 | 330 | 331 | 332 | 333 | 334 | 335 | 336 | 337 | 338 | 339 | 340 |
| 341 | 342 | 343 | 344 | 345 | 346 | 347 | 348 | 349 | 350 | 351 | 352 | 353 | 354 | 355 | 356 | 357 |
| 358 | 359 | 360 | 361 | 362 | 363 | 364 | 365 | 366 | 367 | 368 | 369 | 370 | 371 | 372 | 373 | 374 |
| 375 | 376 | 377 | 378 | 379 | 380 | 381 | 382 | 383 | 384 | 385 | 386 | 387 | 388 | 389 | 390 | 391 |
| 392 | 393 | 394 | 395 | 396 | 397 | 398 | 399 | 400 | 401 | 402 | 403 | 404 | 405 | 406 | 407 | 408 |
| 409 | 410 | 411 | 412 | 413 | 414 | 415 | 416 | 417 | 418 | 419 | 420 | 421 | 422 | 423 | 424 | 425 |

INFORMATION PROCESSING DEVICE AND INFORMATION PROCESSING METHOD

BACKGROUND

Technical Field

The present disclosure relates to an information processing device and an information processing method.

Description of the Related Art

There has been known a handwritten data drawing/input device which, when a user writes text or draws pictures on a paper medium such as a writing paper, can electronically capture the handwritten text or the hand-drawn pictures as handwritten data. This kind of device is generally configured to include a position detection device such as a digitizer, and a stylus configured to function both as an indicator and as a ballpoint pen. The paper medium is arranged on a touch surface of the position detection device. According to this configuration, when a user writes text or draws pictures on the surface of a paper medium by using the ballpoint pen functionality of the stylus, the position detection device can acquire a series of coordinate data indicating a movement track of the stylus on the touch surface. The series of coordinate data thus acquired becomes handwritten data indicating the handwriting of the electronic pen.

Incidentally, the paper medium used in the handwritten data drawing/input device has a plurality of pages in some cases. In this case, the handwritten data drawing/input device needs to create handwritten data separately for each page. Otherwise, the handwriting written on each of the plurality of pages of the paper medium is superimposed on each other onto one page on a screen. In this regard, Japanese Patent No. 6005880 discloses a technique in which an operation button is provided in a position detection device for switching to a new file to accumulate coordinate data, so as to create a file of handwritten data for each page.

BRIEF SUMMARY

Incidentally, in order to save power, the position detection device is designed to automatically enter a stand-by mode in some cases in the case where a non-operation state continues for a predetermined period of time (for example, 15 minutes). In this case, some devices are designed so that the file for accumulating the coordinate data is temporarily closed at the time of entering the stand-by mode, and after returning (or waking up) from the stand-by mode, the coordinate data is accumulated in a new file.

However, according to such a stand-by process, even if the user writes on the same page of the paper medium before and after the stand-by mode, the coordinate data after returning from the stand-by mode is accumulated in a file different from the file used before entering into the stand-by mode. In this case, the handwritten text may be recorded in a divided state into a plurality of files although the handwritten text is written on the same page of a paper medium. Then, the handwritten text may be misunderstood as being written on a plurality of pages. A need exists for improvement in this regard.

In addition, according to the technique disclosed in Japanese Patent No. 6005880, when the user forgets to press the operation button, the handwritten data written on each of the plurality of pages of the paper medium is accumulated in one file. This results in that the pages of the paper medium do not have a one-to-one correspondence with the files. A need exists for improvement in this regard.

According to one aspect of the present disclosure, an information processing device and an information processing method are provided which are capable of associating pages of a paper medium with files for accumulating handwritten data in a one-to-one correspondence.

An information processing device according to the present disclosure includes a storage unit configured to store handwritten data generated according to handwritten input to a sheet-like recording medium, in the form of a first file corresponding to a first page and a second file corresponding to a second page. The information processing device includes a control unit configured to determine whether or not to couple (or combine) the first file and the second file on the basis of a first identification result identifying a region of the first page in which the handwritten data has been written or a region of the first page in which the handwriting not been written, the first identification result being based on the handwritten data stored in the first file, and a second identification result identifying a region of the second page in which the handwritten data has been written or a region of the second page in which the handwriting data has not been written, the second identification result being based on the handwritten data stored in the second file. In response to a determination that the first file and the second file are to be coupled, the control unit controls coupling of the first file and the second file.

An information processing method according to the present disclosure is executed by an information processing device having a storage unit that stores handwritten data generated according to handwritten input to a sheet-like recording medium in the form of a first file corresponding to a first page and a second file corresponding to a second page. The method includes determining whether or not to couple (or combine) the first file and the second file on the basis of a first identification result identifying a region of the first page in which the handwritten data has been written or a region of the first page in which the handwriting data has not been written, the first identification result being based on the handwritten data stored in the first file, and a second identification result identifying a region of the second page in which the handwritten data has been written or a region of the second page in which the handwriting data has not been written, the second identification result being based on the handwritten data stored in the second file. The method includes controlling coupling of the first file and the second file in response to a determination that the first file and the second file are to be coupled.

According to the present disclosure, it is possible to prevent handwritten information written on the same page of a paper medium from being inadvertently recorded in a plurality of files.

BRIEF DESCRIPTION OF THE SEVERAL VIEWS OF THE DRAWINGS

FIGS. 5A and 5B are diagrams each depicting an example of the written state of pages #1 and #2 according to a first aspect of the present disclosure;

FIG. 7 is a diagram depicting a sample result of drawing one or more pieces of stroke data stored in file #n on a touch screen, which can be resolved according to a second aspect of the present disclosure;

DETAILED DESCRIPTION

Hereinafter, embodiments of the present disclosure will be described in detail with reference to the accompanying drawings.

Figure 1:
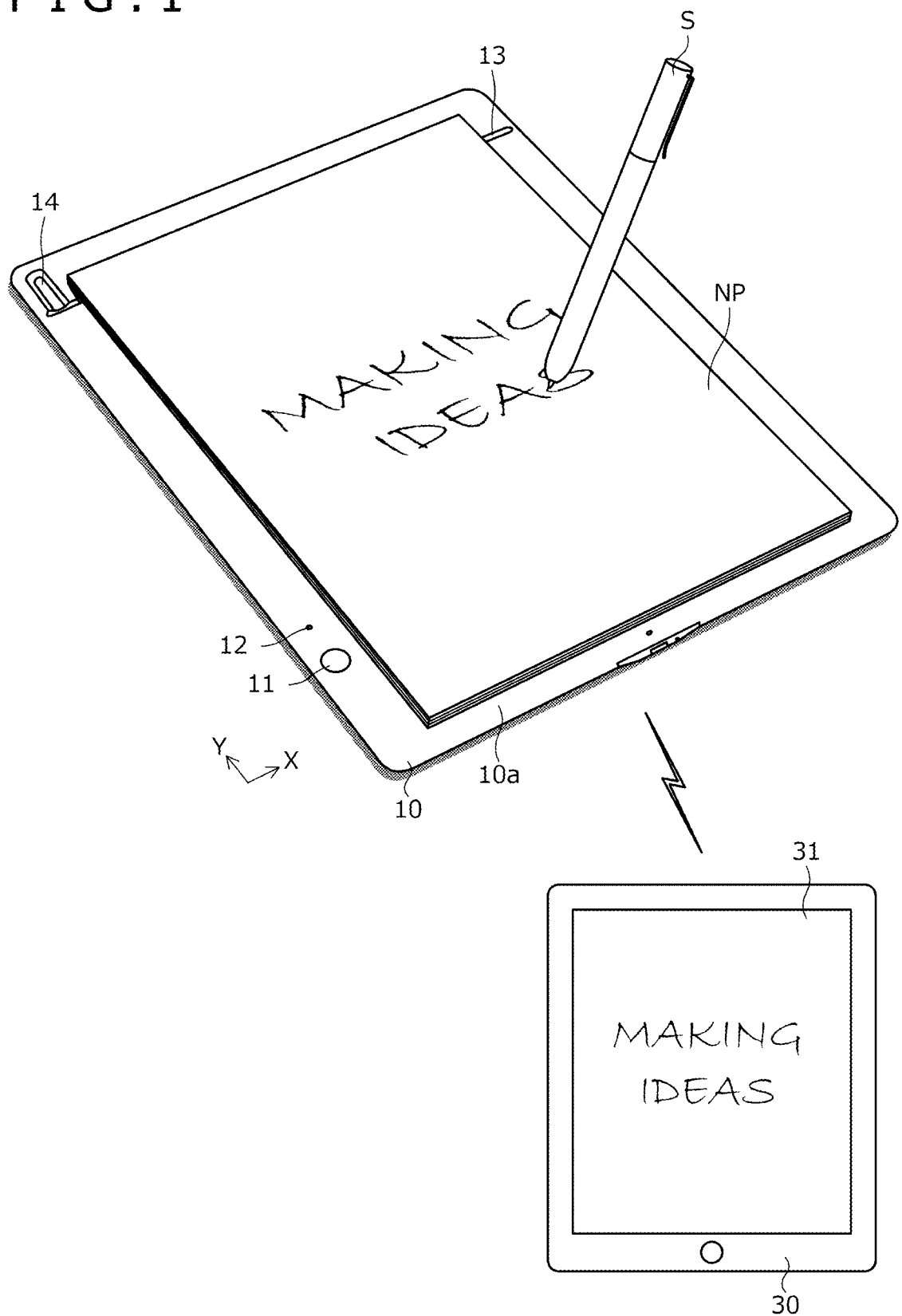
FIG. 1 is a diagram for depicting a position detection device and a tablet terminal according to an embodiment of the present disclosure.

FIG. 1 is a diagram for depicting a position detection device 10 and a tablet terminal 30 according to an embodiment of the present disclosure. The position detection device 10 is a device that incorporates a capacitance touch panel and detects, based on the touch panel, a position of a stylus S on a touch surface 10a. Instead of the capacitance touch panel, the position detection device 10 may incorporate an electromagnetic induction touch panel, for example.

The stylus S is configured to support an active capacitive system, and functions as an indicator for indicating a position on the touch surface 10a, and also functions as a writing tool (for example, as a ballpoint pen) for visually leaving handwriting on a surface of a sheet-like recording medium such as paper. The tablet terminal 30 is an information processing device having a touch screen 31 configured to receive touch input. The position detection device 10 and the tablet terminal 30 are mutually connected by wireless communication such as via a Bluetooth (registered trademark) technology, or by wired communication such as via a universal serial bus (USB).

An X direction and a Y direction depicted in FIG. 1 are directions corresponding to a lateral direction and a depth direction, respectively, when viewed from the user of the position detection device 10. The position detection device 10 has a rectangular shape in which one side in the Y direction is longer than one side in the X direction, and is used, as depicted in FIG. 1, in a state where a rectangular note pad NP as a sheet-like recording medium slightly smaller than the position detection device 10 is mounted on the touch surface 10a. As will be described in detail later, when the user writes text letters or draws pictures on the surface of the note pad NP by using the stylus S as a writing tool, a track (trace) of the stylus S is detected as a series of coordinate data by the position detection device 10. The tablet terminal 30 acquires the series of coordinate data from the position detection device 10 to generate stroke data and displays the generated stroke data on the touch screen 31. FIG. 1 depicts a state in which a letter string "MAKING IDEAS" written on the note pad NP by the user is displayed on the touch screen 31 of the tablet terminal 30 according to these processes. It should be noted that the sheet-like recording medium is generally made of paper material but may be a material made of a resin or the like.

As depicted in FIG. 1, the position detection device 10 is configured to have a power supply/operation button 11, a power supply lamp 12, a paper storage section 13, and a stylus storage section 14. Of these, the power supply/operation button 11 is a switch for turning on/off the power supply of the position detection device 10, and is also a switch for receiving a page break instruction from the user. In the case where the power supply/operation button 11 is continuously depressed for a predetermined period of time or more (that is, in the case where it is depressed for a long time), the position detection device 10 turns on or off the power supply of the position detection device 10. On the other hand, in the case where the power supply/operation button 11 is depressed but the depressed state is eliminated before reaching the predetermined period of time (that is, in the case where it is depressed for a short time), the position detection device 10 receives a page break instruction from the user. In addition, the power supply lamp 12 is a lamp that is turned on when the power supply of the position detection device 10 is on and is turned off when the power supply of the position detection device 10 is off.

Here, the page is a concept corresponding to a block of handwritten data generated according to handwritten input, or to a file including the block of handwritten data. Therefore, the handwritten data or the file including the handwritten data generated by handwritten input to each page of the sheet-like recording medium formed of a plurality of pages is associated with each page. Furthermore, in the case where the handwritten data generated by handwritten input on the same page of the sheet-like recording medium is divided into a plurality of pieces of handwritten data or files based on the stand-by mode operation, discussed in the background section above, or based on an operation by the user, each of the divided handwritten data or files is associated with a corresponding page.

The paper storage section 13 is an opening configured to receive a backboard of the note pad NP. The user places the note pad NP on the position detection device 10 by inserting the backboard of the note pad NP into the paper storage section 13. The stylus storage section 14 is a recess for securely receiving the stylus S. When the user does not use the stylus S, the stylus S may be fixed to the position detection device 10 by inserting a clip of the stylus S into the opening of the paper storage section 13 and fitting a top end portion of the stylus S in the recess of the stylus storage section 14.

As a basic operation, the position detection device 10 is configured to accumulate a series of sequentially-detected coordinate data in one file. Therefore, if the user writes on a plurality of pages while turning pages of the note pad NP, the coordinate data related to the handwriting of different pages is included in one file. When the series of coordinate data thus accumulated is displayed on the touch screen 31 of the tablet terminal 30, the handwriting related to a plurality of pages is superimposed on each other and displayed together.

Since this would hinder practical utility, the position detection device 10 is configured so that the user can instruct a page break. Specifically, when the user depresses the power supply/operation button 11 for a short time, the position detection device 10 receives the page break instruction as described above, and switches to a new file as the accumulation destination of the coordinate data. Since a file of handwritten data is created for each page by this operation, the handwriting related to a plurality of pages is prevented from being superimposed on each other to be displayed together on the touch screen 31 as described above.

However, in practice, the user may sometimes forget to depress the power supply/operation button 11 for a short time. As a result, the handwriting related to a plurality of pages may be superimposed and displayed together on the touch screen 31. Thus, the tablet terminal 30 has a configuration for dividing the file after the file has been created, as will be described in detail later as a second aspect of the present disclosure.

In the case where a non-operation state continues for a predetermined period of time (for example, 15 minutes), in order to save power, the position detection device 10 is designed to automatically enter the stand-by mode. The non-operation state in this case includes non-detection of the coordinate data of the stylus S. The position detection device 10 having entered the stand-by mode is configured to save power consumption by not performing any operation other than, for example, detection of the depression of the power supply/operation button 11. The position detection device 10 having detected the depression (long or short depression) of the power supply/operation button 11 while in the stand-by mode is configured to return from the stand-by mode to start any stopped operation other than the detection of a depression of the power supply/operation button 11.

Here, in order to prevent destruction or loss of a file, the position detection device 10 is configured, when entering the stand-by mode, to temporarily close the file in which the coordinate data is being accumulated. In addition, after returning from the stand-by mode, a new file is generated, and the coordinate data is stored in the new file. According to such a configuration of the position detection device 10, while the destruction or loss of a file can be prevented, even if the user writes on the same page of the paper medium before and after the stand-by mode, the coordinate data after returning from the stand-by mode is accumulated in a new file different from the file used before entering the stand-by mode. As a result, the handwritten data written on the same page is treated as data written on another page. Thus, the tablet terminal 30 has a configuration for consolidating (combining) the handwritten data written on the same page into one file after multiple files have been created. This point will be described in detail later as a first aspect of the present disclosure.

Figure 2:
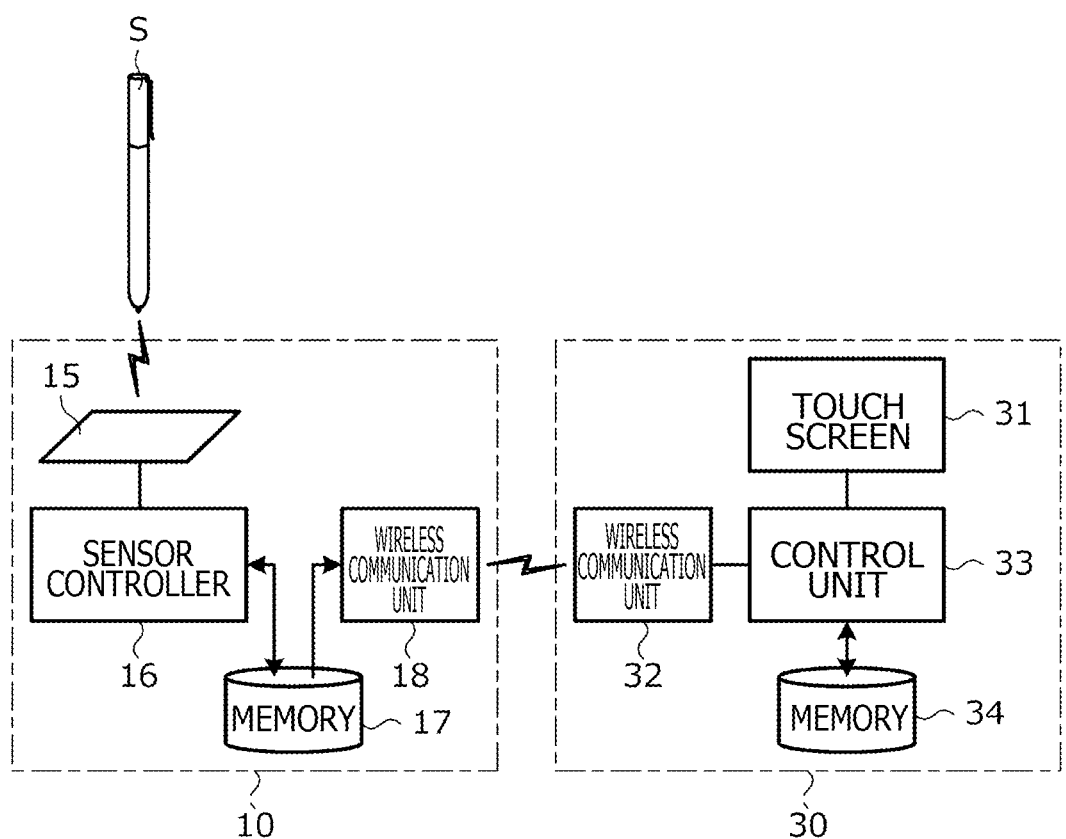
FIG. 2 is a diagram for depicting internal configurations of the position detection device and the tablet terminal.

FIG. 2 is a diagram for depicting internal configurations of the position detection device 10 and the tablet terminal 30. As depicted in the drawing, the position detection device 10 is configured to further include a touch panel 15, a sensor controller 16, a memory 17, and a wireless communication unit 18. In addition, the tablet terminal 30 is configured to include, in addition to the touch screen 31 depicted in FIG. 1, a wireless communication unit 32, a control unit 33, and a memory 34.

The touch panel 15 is a projected capacitive touch panel (PCAP) which supports the position detection of the stylus S based on an active electrostatic system and the position detection of a finger based on a capacitance system.

Figure 3:
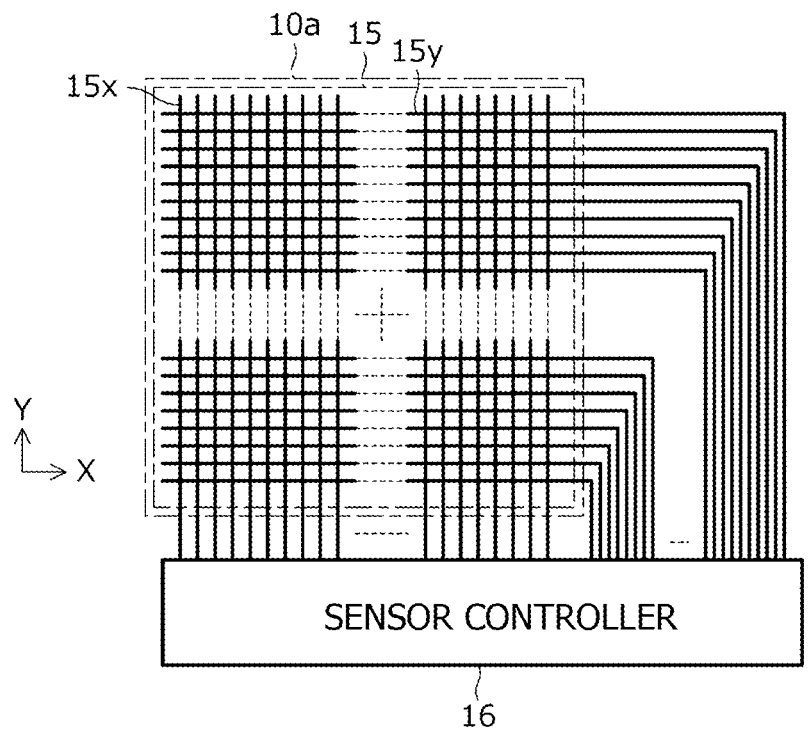
FIG. 3 is a diagram for depicting a detailed configuration of a touch panel.

FIG. 3 is a diagram for depicting a detailed configuration of the touch panel 15. As depicted in the drawing, the touch panel 15 is configured to have a plurality of linear electrodes 15x and 15y arranged so as to cover the entire touch surface 10a. The plurality of linear electrodes 15x each extending in the Y direction are arranged at equal intervals in the X direction orthogonal to the Y direction. The plurality of linear electrodes 15y each extending in the X direction are arranged at equal intervals in the Y direction. Each of the plurality of linear electrodes 15x and 15y is connected to the sensor controller 16.

The explanation will continue by referring back to FIG. 2. The sensor controller 16 is an integrated circuit that detects the position of the stylus S by using the touch panel 15 and also receives data transmitted by the stylus S. The sensor controller 16 also performs a process of detecting the position of a finger within the touch surface 10a by using the touch panel 15. The position of the stylus S is detected by an active electrostatic system, and the position of a finger is detected by a capacitance system.

The detection of the stylus S by the sensor controller 16 will be described while referring back to FIG. 3. The sensor controller 16 is configured so as to periodically transmit an uplink signal by using all of the plurality of linear electrodes 15x (or the plurality of linear electrodes 15y) depicted in FIG. 3. The uplink signal plays a role of informing the stylus S of the transmission timing of a downlink signal and a role of transmitting a command to the stylus S.

The stylus S having received the uplink signal transmits the downlink signal at the timing indicated by the uplink signal. In the case where the stylus S is not yet paired with the sensor controller 16, the downlink signal is configured using an unmodulated burst signal having a predetermined time length. Hereinafter, the burst signal will be referred to as a "position signal." On the other hand, in the case where the stylus S is paired with the sensor controller 16, the downlink signal is configured to include the position signal having a shorter time length and a data signal. The data signal is a signal modulated by data requested (instructed) by a command included in the uplink signal. Examples of data transmitted by the data signal include a pen pressure value indicating a pressure applied to a tip end of the stylus S, switch information indicating an on/off state of a button provided on the stylus S, a pen identification (ID) pre-stored in the stylus S, and the like.

In the case where the sensor controller 16 is not yet paired with the stylus S, the sensor controller 16 attempts to detect the downlink signal transmitted by the stylus S throughout the touch surface 10a by scanning all of the plurality of linear electrodes 15x and 15y after transmitting the uplink signal (global scan). In the case where the downlink signal is detected by this detection, the sensor controller 16 detects the position of the stylus S on the basis of the reception intensity of the downlink signal at each of the plurality of linear electrodes 15x and 15y, and performs a predetermined pairing operation with the stylus S. Upon completion of this operation, the sensor controller 16 and the stylus S are paired with each other.

After transmitting the uplink signal, the sensor controller 16 paired with the stylus S attempts to detect the position signal transmitted by the stylus S with only a part (portion) of the touch surface 10a by scanning only a predetermined number of linear electrodes 15x and 15y in the vicinity of the last detected position of the stylus S among the plurality of linear electrodes 15x and 15y (local scan). Then, the position of the stylus S is newly acquired on the basis of the reception intensity of the downlink signal at each of the linear electrodes 15x and 15y. Subsequently, the sensor controller 16 receives the data signal transmitted by the stylus S by scanning only one of the plurality of linear electrodes 15x and 15y in the vicinity of the last detected position of the stylus S. Then, the data transmitted by the stylus S is acquired by demodulating the received data signal.

The explanation will continue by referring back to FIG. 2. The memory 17 is a storage unit configured to manage data in units of files. The sensor controller 16 is configured to write coordinate data indicating the position of the stylus S detected by the active capacitive system and data received from the stylus S (hereinafter collectively referred to as "handwritten data") to a file in the memory 17. Accordingly, a series of handwritten data depicting the handwriting of the user is accumulated in the file. The respective files are stored in the memory 17 in an ordered state such as #1,#2, . . . in the order of generation.

Figure 4:
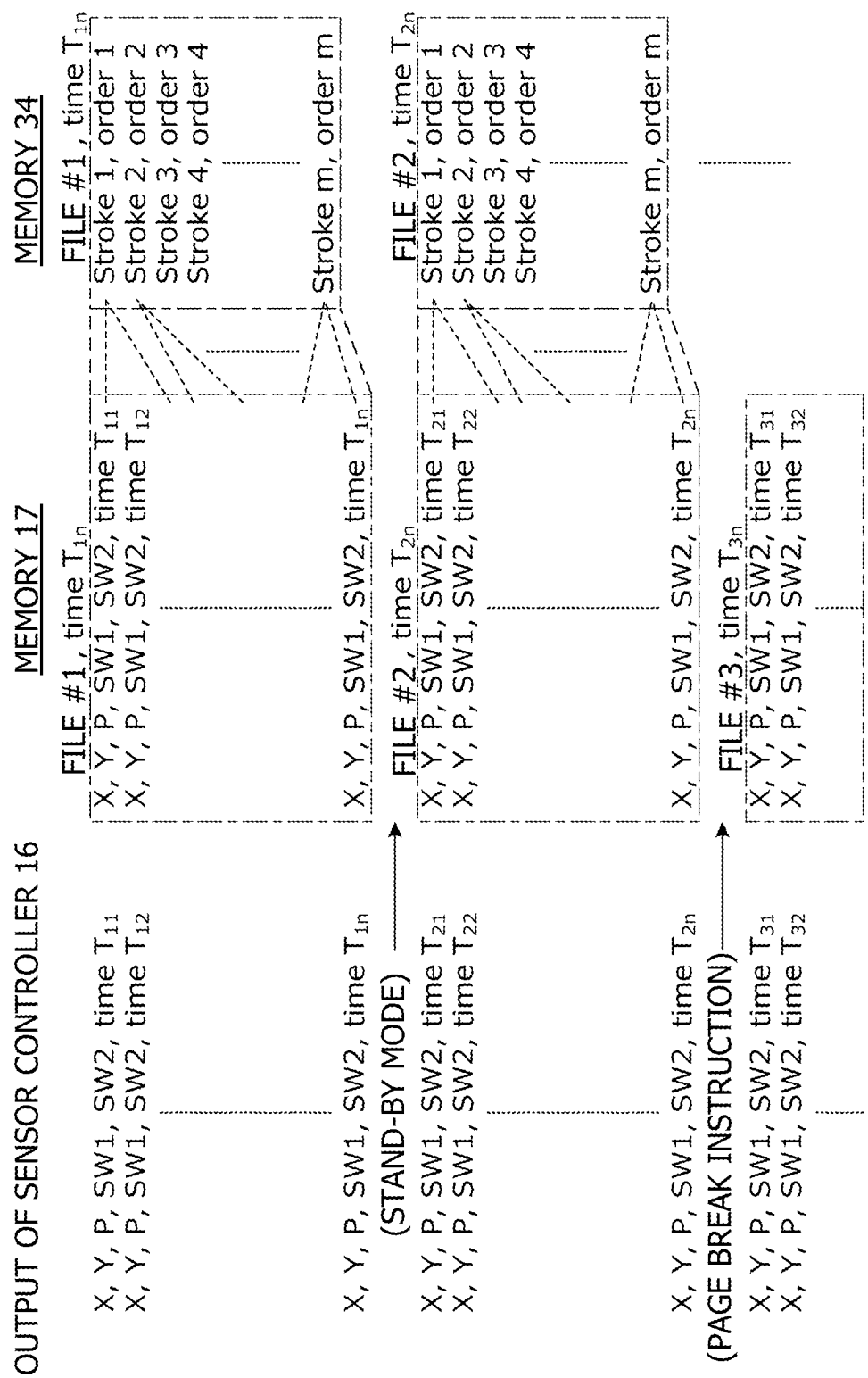
FIG. 4 is a diagram for depicting handwritten data output from a sensor controller, files for storing the handwritten data, and stroke data stored by a control unit in a memory.

FIG. 4 is a diagram for depicting handwritten data output from the sensor controller 16 and files for storing the handwritten data. The sensor controller 16 according to this example is configured to generate handwritten data including coordinate data (X, Y) indicating the position of the stylus S, a pen pressure value P and switch information SW1 and SW2 received from the stylus S, and time stamp information indicating time T at which the position is detected, and output the generated handwritten data to the memory 17. Hereinafter, the explanation will be continued on the premise of this example.

The sensor controller 16 is configured to generate a new file in the memory 17 in the case where the position detection device 10 is turned on, in the case where the position detection device 10 returns from the stand-by mode, and in the case where the short depression of the power supply/operation button 11 is detected. In FIG. 4, a file #1 is a file generated according to the power-on of the position detection device 10, a file #2 is a file generated according to the returning from the stand-by mode, and a file #3 is a file generated according to the detection of the short depression of the power supply/operation button 11. When a new file is generated, the sensor controller 16 changes the output destination of the handwritten data to the new file.

The explanation will continue by referring back to FIG. 2. The wireless communication unit 18 is a functional unit that extracts the file accumulated in the memory 17 and transmits the extracted file to the tablet terminal 30. The extraction and transmission of the file by the wireless communication unit 18 may be executed according to a transmission instruction from the tablet terminal 30, or may be executed according to the user activation of an operation element on the position detection device 10. In addition, in the case where the position detection device 10 and the tablet terminal 30 come close to a communicable distance, transmission may be automatically executed. In addition, the wireless communication unit 18 may transmit the accumulated handwritten data, not in units of files, but together with information specifying a page on which the handwritten data is written each time the handwritten data for one coordinate is accumulated (written) in the memory 17 by the sensor controller 16. In this manner, the handwritten data can be displayed in real time on the touch screen 31 of the tablet terminal 30. In this case, the file management is performed by the tablet terminal 30.

Moving to the tablet terminal 30, the wireless communication unit 32 receives the handwritten data from the position detection device 10 and supplies the handwritten data to the control unit 33. The control unit 33 generates stroke data as drawing vector data on the basis of a series of handwritten data supplied from the wireless communication unit 32, and stores the stroke data in the memory 34.

FIG. 4 also depicts the stroke data stored in the memory 34 by the control unit 33. As depicted in the drawing, the stroke data is data including one or more pieces of handwritten data, and the control unit 33 is configured to collectively store the one or more pieces of stroke data in the memory 34 per file. Here, the memory 34 is a storage unit configured to manage data in units of files, as similar to the memory 17. The order of the files in the memory 17 is also maintained in the memory 34.

A method of generating the stroke data by the control unit 33 will be described in detail. In order to generate the stroke data from a series of handwritten data, the control unit 33 first determines delimiters (breaks) between the strokes by referring to the pen pressure value P in each handwritten data. That is, since the unit handwritten data in which the corresponding pen pressure value P is zero is acquired by the pen in a hover state, the data does not contribute to handwriting. Therefore, the control unit 33 excludes such handwritten data from the generation target of the stroke data, and determines the portion including the excluded handwritten data as a stroke delimiter. Then, one stroke data is generated by a set of one or more pieces of handwritten data delineated by the delimiter.

When generating the stroke data, the control unit 33 refers to the time stamp information of each handwritten data to assign order information to each of a series of generated stroke data. Accordingly, each stroke data in the file stored in the memory 34 is ordered in the handwriting order. In the example of FIG. 4, the data written as "order n" (n is a natural number) is the order information, and the natural number n indicates the handwriting order.

The control unit 33 is also configured to have a function of extracting a file stored in the memory 34, rendering each stroke data included in the file, and displaying the result on the touch screen 31, and a function of recognizing a touch operation of the user on the touch screen 31 and performing a process according to the content of the touch operation.

In addition to the above functions, the control unit 33 is configured to perform a function of coupling (combining) files and/or dividing a file stored in the memory 34. Of these, the function of coupling files corresponds to the above-described first aspect of the present disclosure, and the function of dividing a file corresponds to the above-described second aspect of the present disclosure. Hereinafter, the processes performed by the control unit 33 will be described in detail in the order of the first aspect of the present disclosure and the second aspect of the present disclosure. It should be noted that although the embodiments will be described by taking, as an example, a case where the file storing the stroke data (the file stored in the memory 34) is coupled or divided, the control unit 33 may also couple or divide the file storing the handwritten data (the file stored in the memory 17). In this case, it may be preferable that the control unit 33 temporarily copies or creates a file storing the handwritten data in the memory 34, and then performs the coupling or dividing processing of the copied or created file.

Figures 5A, 5B:
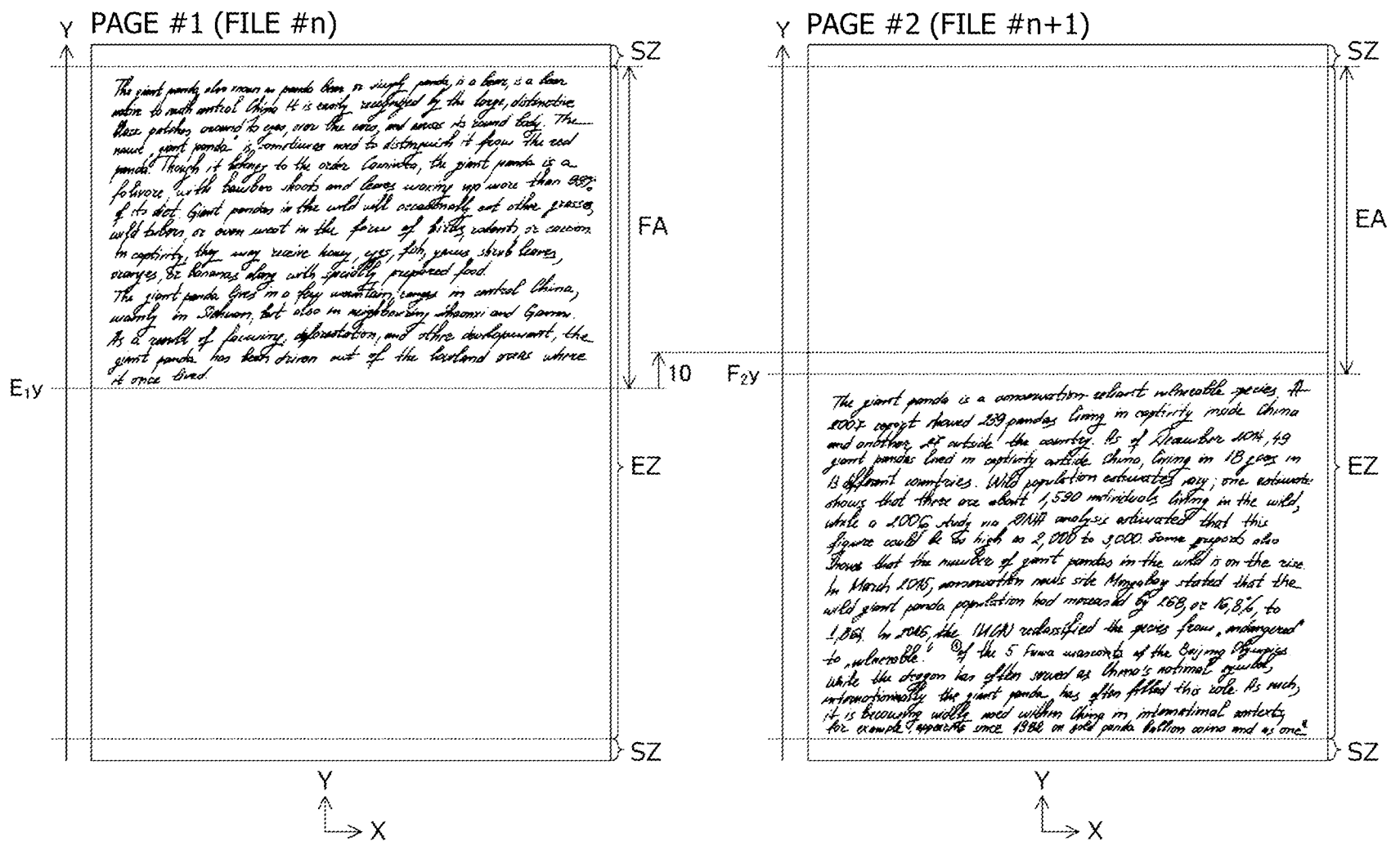

FIGS. 5A and 5B are diagrams each depicting an example of the written state of pages #1 and #2 according to the first aspect of the present disclosure. Pages #1 and #2 are pages corresponding to two files #n and #n+1, respectively, among the plurality of files stored in order in the memory 34. The English sentences written on pages #1 and #2 are written by the user in order from the top on one page of a paper medium. However, when the user interrupts the handwriting for a while in the middle of the writing and the position detection device 10 enters the stand-by mode, the file is divided into two files in the memories 17 and 34 as depicted in FIGS. 5A and 5B.

Here, in the case where sentences are written on one page of the paper medium, the user proceeds to write, line by line, from one end of the page in the Y direction (a writing start end) toward the other end in the Y direction (a writing termination end), and proceeds to write, per line, from one end in the X direction toward the other end in the X direction. It should be noted that the "one end in the Y direction" as the writing start end is the "upper end" in the case where the user writes horizontally on the paper medium. The "one end in the X direction" as the writing start end may be the "left end" in the case where the user writes vertically. Hereinafter, the explanation will be continued on the premise of horizontal writing, but the present disclosure is also applicable to support vertical writing.

Since the user proceeds to write as described above, in the case where the file is changed in the middle of one page of the paper medium, as shown in FIGS. 5A and 5B, in page #2 corresponding to the second file #n+1, a region having a predetermined length from the upper end becomes a blank region EA and, furthermore, the lower end $F_2y$ (terminal end) of the blank region EA is positioned substantively below (toward the writing termination end side) the lower end $E_1y$ (terminal end) of the written region FA in page #1 corresponding to the first file #n (or "$E_1y+10$" in the illustrated example of FIG. 5A, as will be more fully described below). The relative positions of $F_2y$ and $E_1y$ may be referred to as a positional relation. It should be noted that "substantively" is used here to consider a case where each line is written upward to the right, or a case where switching of the file occurs in the middle of a line, as in the examples of FIGS. 5A and 5B. The control unit 33 according to the first aspect of the present disclosure is configured to determine whether or not to couple (combine) files #n and #n+1 by determining the positional relation, and to execute the coupling process of files #n and #n+1 according to the determination result. Using the coupling process, each handwritten input divided into a plurality of files can be connected (combined) again as a series of handwritten input.

Figure 6:
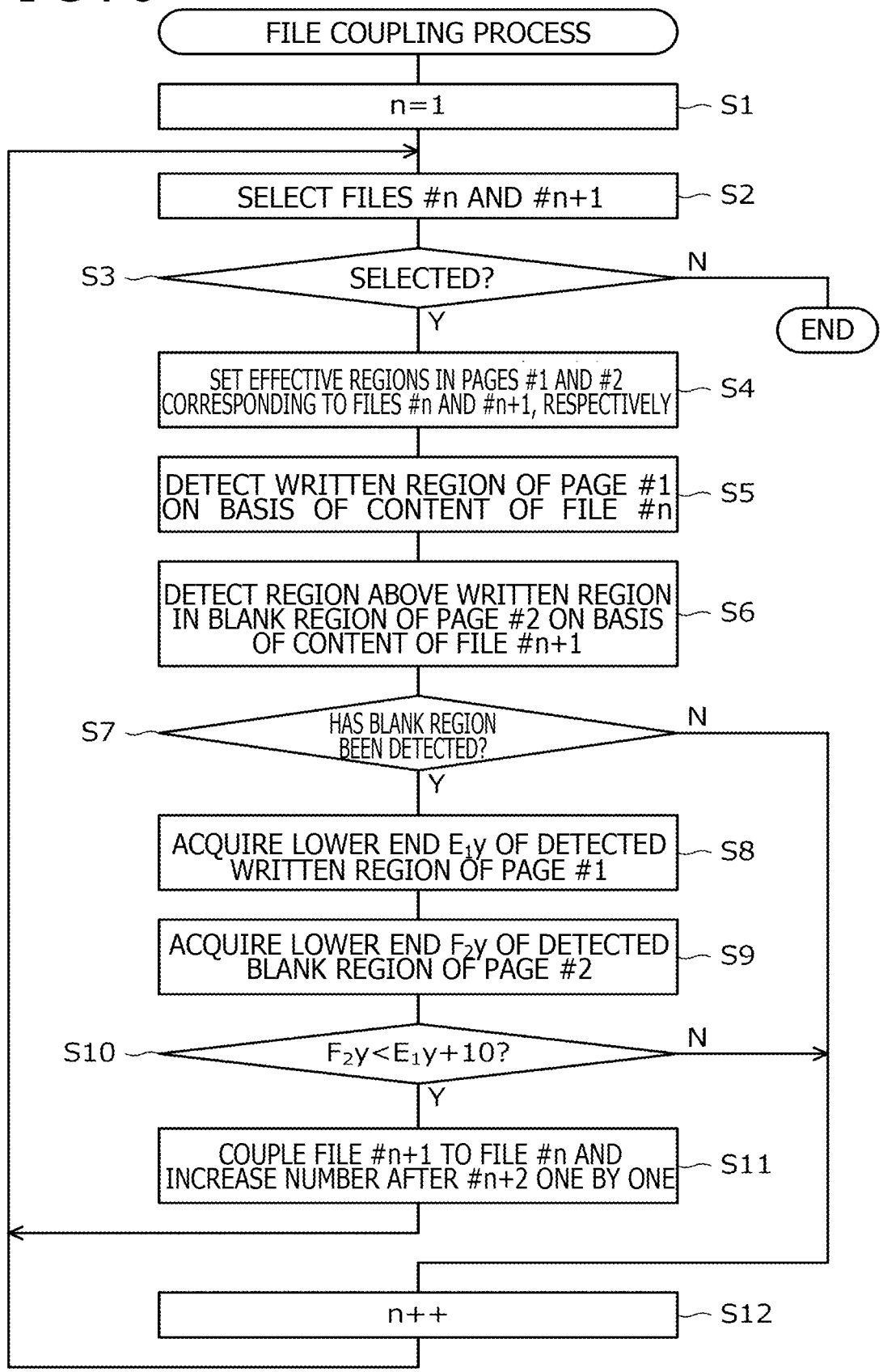
FIG. 6 is a flowchart for depicting a file coupling process, according to the first aspect of the present disclosure.

FIG. 6 is a flowchart for depicting a file coupling process according to the first aspect of the present disclosure. Hereinafter, the process of the control unit 33 according to the first aspect of the present disclosure will be specifically described with reference to this flowchart.

The control unit 33 first assigns 1 to a variable n (step S1). Subsequently, the control unit 33 attempts to select two files #n and #n+1 stored in the memory 34 (step S2), and determines whether the two files #n and #n+1 have been successfully selected (step S3). If files #n and #n+1 have not been selected (N to step S3), the control unit 33 terminates the file coupling process.

Next, the control unit 33 sets effective regions EZ in pages #1 and #2 corresponding to files #n and #n+1, respectively (step S4). As depicted in FIGS. 5A and 5B, the effective region EZ is a region within a page sandwiched between safe zones SZ provided at the upper end and lower end of each page. In general, the safe zone SZ is a region in which the user does not perform a writing action. The specific size of each safe zone SZ may be set by the user.

Next, on the basis of the handwritten data stored in file #n, the control unit 33 acquires a first identification result identifying a region of page #1 in which the handwritten data has been written or a region of page #1 in which handwritten data has not been written (step S5). It may be preferable that the first identification result is generated on the basis of the terminal end information (the lower end $E_1y$ depicted in FIG. 5A) of the handwritten data stored in file #n, which corresponds to the written region FA described above. In this case, it may be preferable that the written region FA is a region including all the stroke data corresponding to file #n. Specifically, the maximum value and minimum value are acquired from the y coordinates (coordinate information) included in the coordinates forming each stroke data stored in file #n, and a region sandwiched between a straight line extending in the X direction at a position corresponding to the acquired maximum value and a straight line extending in the X direction at a position corresponding to the acquired minimum value is detected as the written region FA. It should be noted that, in the example of FIG. 5A, the upper end of the written region FA coincides with the upper end of the effective region EZ, but it is not necessary for the upper end of the written region FA to coincide with the upper end of the effective region EZ.

Next, on the basis of the handwritten data stored in file #n+1, the control unit 33 acquires a second identification result identifying a region of page #2 in which the handwritten data has been written or a region of page #2 in which the handwritten data has not been written (step S6). It may be preferable that the second identification result is generated on the basis of the start end information (the lower end Fey depicted in FIG. 5B) of the handwritten data stored in file #n+1, which corresponds to the blank region EA which, among one or more blank regions included in page #2, is positioned on the upper side (the writing start end side) when viewed from the written region in page #2. Specifically, the written region of page #2 is detected similarly to step S6, and the region on the upper side (the writing start end side) of the written region in which no stroke data exists is detected as the blank region EA.

Subsequently, the control unit 33 determines whether or not the blank region EA has been detected in step S6 (step S7), and in the case where it is determined that the blank region EA has not been detected, n is incremented by 1 (step S12), and the process returns to step S2. In the case where there is no blank region above the written region of page #2, file #n+1 cannot be coupled to file #n. Therefore, by performing step S7, the processing to not couple multiple files can be accelerated.

The control unit 33 having determined the blank region EA has been detected in step S7 executes steps S8 to S11 described below to determine whether or not to couple files #n and #n+1 on the basis of the positional relation of the regions in which the handwritten data has been written or the regions in which the handwritten data has not been written in pages #1 and #2, that is, on the basis of the first identification result and the second identification result.

Specifically, the control unit 33 first acquires the lower end $E_1y$ of the written region FA detected in step S5 (step S8), and acquires the lower end $F_2y$ of the blank region EA detected in step S6 (step S9). Then, the control unit 33 determines whether or not to couple files #n and #n+1 on the basis of the acquired lower ends $E_1y$ and $F_2y$ (step S10). Specifically, the determination in step S10 is made by determining whether or not $F_2y$ is smaller than $E_1y+10$ ($F_2y<E_1y+10$) in the Y direction (see FIGS. 5A and 5B). It should be noted that the number "10" used in the determination is merely an example, and, for example, a predetermined value set by the user may be used.

That $F_2y$ is smaller than $E_1y+10$ means that the lower end of the blank region EA detected in step S6 is positioned substantively below the lower end of the written region FA detected in step S5. This means that there is a high possibility that the written region FA detected in step S5 can be placed in the blank region EA detected in step S6, and thus the control unit 33 performs a process of coupling file #n+1 to file #n in the case where $F_{2y}$ is determined to be smaller in step S10 (step S11). Specifically, the coupling may be performed by moving all the stroke data in file #n+1 to the end of file #n. In step S11, additionally, the numbers of files #n+2 and later (#n+3, #n+4, etc.) are respectively increased (up) by 1 to be #n+1, #n+2, #n+3, etc. (because file #n+1 has been combined into file #n and no longer exists). On the other hand, in the case where $F_{2y}$ is determined to be not smaller in step S10, the control unit 33 increments n by 1 (n+1) (step S12) without coupling the files and returns the process to step S2.

After executing step S11, the control unit 33 returns the process to step S2 without incrementing n. Accordingly, it is possible to appropriately couple the files even in the case where the entry to the stand-by mode is performed a plurality of times during writing on one page of the paper medium.

As described above, according to the function of the tablet terminal 30 according to the first aspect of the present disclosure, since a plurality of files storing the results of writing on the same page of the paper medium can be coupled and combined into one file, it is possible to correctly associate the pages of the paper medium with the files for storing the handwritten data in a one-to-one correspondence even in the case where the entry of the position detection device 10 to the stand-by mode disrupts a one-to-one correspondence between pages of the paper medium and files.

Figure 7:
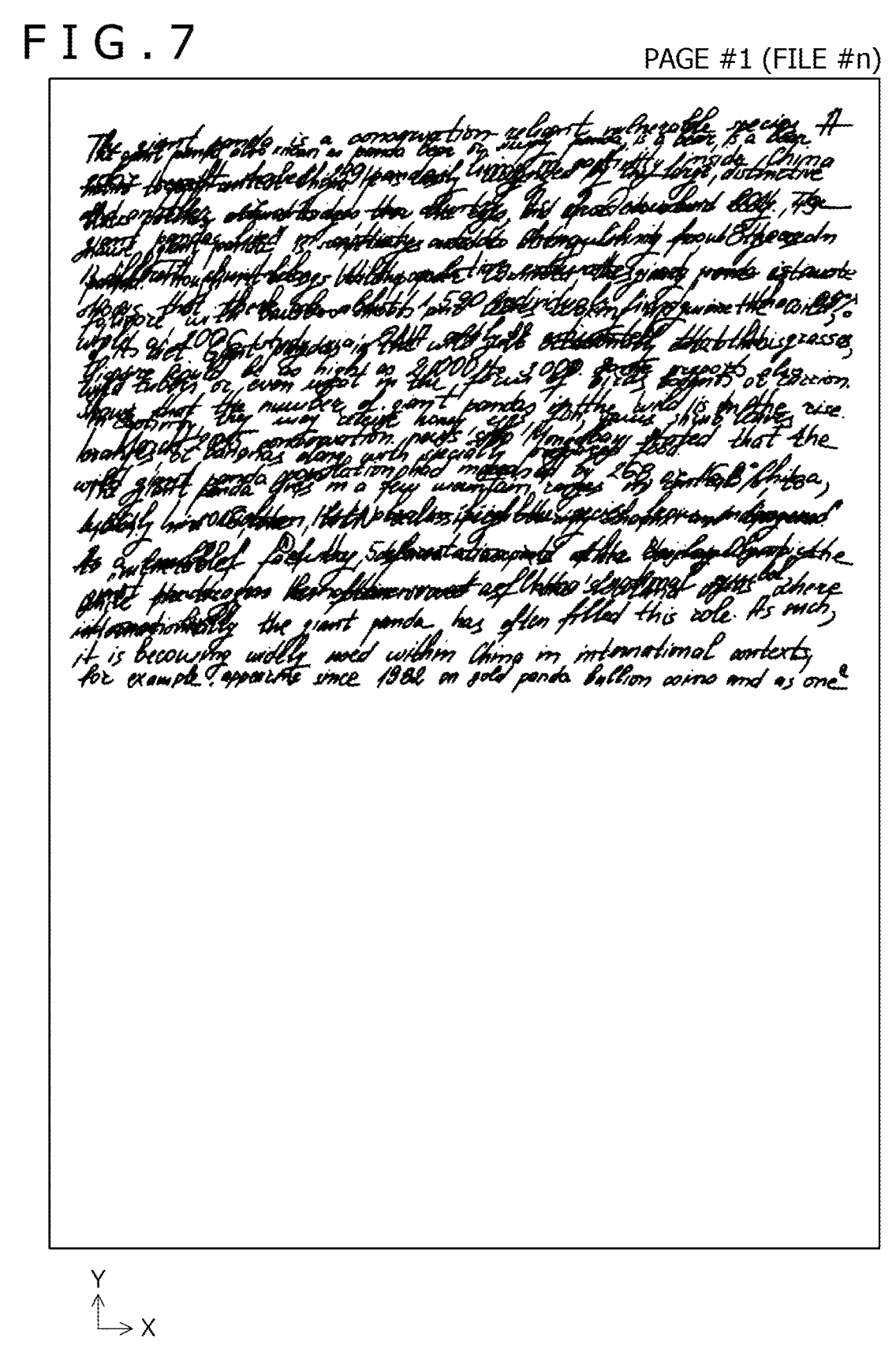

Next, FIG. 7 is a diagram depicting a sample result of drawing one or more pieces of stroke data stored in file #n on the touch screen 31, which can be resolved according to the second aspect of the present disclosure. The user writes the English sentences depicted in FIG. 5A on one page of the paper medium and then turns over the page to write the English sentences depicted in FIG. 5B on another page of the paper medium, but as a result of forgetting to perform the short depression of the power supply/operation button 11 when turning over the page, the stroke data corresponding to each of the two pages is accumulated in one file #n. As a result, the text handwritten over the two pages of the paper medium is superimposed and displayed together in one page #1 on the touch screen 31, as shown in FIG. 7.

Figure 8:
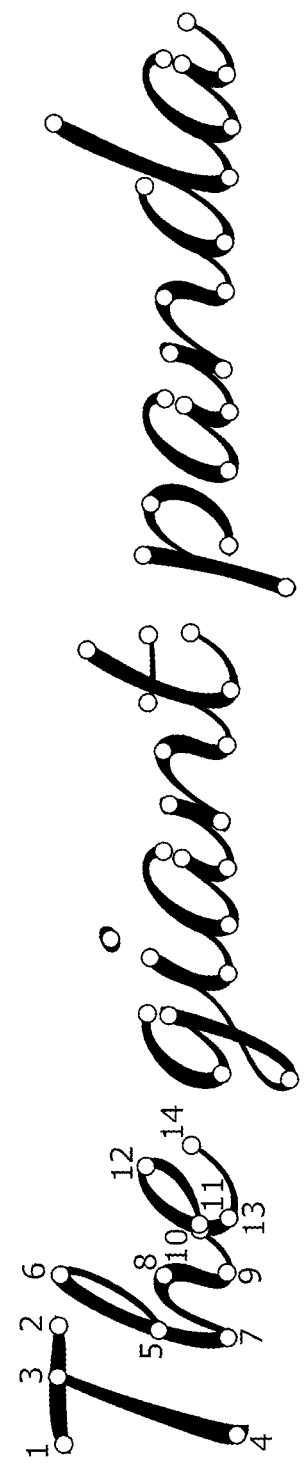
FIG. 8 is a diagram for depicting point numbers.
Figure 9:
FIG. 9 is a diagram for depicting page coordinates.

FIG. 8 and FIG. 9 are diagrams for depicting point numbers and page coordinates, respectively. The control unit 33 is configured to use the point numbers and the page coordinates to execute the process according to the second aspect of the present disclosure.

The point number is attribute information based on the number of strokes corresponding to handwritten input, and is herein a number indicating a serial number of each point within one or more pieces of stroke data included in one file. FIG. 8 depicts an example in which the point numbers are assigned to end points of the stroke data as well as to points on curves having a predetermined curvature value or more of the stroke data. However, the points to which the point numbers are assigned are not limited to the illustrated examples, and may be, for example, control points used when drawing the stroke data (e.g., control points of a Catmull-Rom curve), or points included in each of one or more pieces of handwritten data used by the control unit 33 to generate the stroke data (e.g., coordinate data).

The page coordinate is a number indicating a serial number of each cell obtained by dividing one page into a lattice shape, and is assigned to each cell so that the number increases along the direction in which the letter string is written as depicted in FIG. 9. FIG. 9 depicts an example in which one page is divided into 425 cells.

Figure 10:
FIG. 10 is a diagram in which only text letters corresponding to point numbers 1 to 899 among a plurality of text letters depicted in FIG. 7 are superimposed and written on the page coordinates depicted in FIG. 9.
Figure 11:
FIG. 11 is a diagram in which only text letters corresponding to the point number 900 and later among the plurality of text letters depicted in FIG. 7 are superimposed and written on the page coordinates depicted in FIG. 9.

FIG. 10 is a diagram in which only the letters corresponding to the point numbers 1 to 899 among the plurality of letters depicted in FIG. 7 are superimposed and written on the page coordinates depicted in FIG. 9. In addition, FIG. 11 is a diagram in which only the letters corresponding to the point number 900 and later among the plurality of letters depicted in FIG. 7 are superimposed and written on the page coordinates depicted in FIG. 9. As can be understood from these drawings, assuming that the user writes sentences on a page in the above-described writing style (that is, the writing style in which the sentences are written from one end of the page in the Y direction toward the other end in the Y direction, line by line, and the sentences are written from one end in the X direction toward the other end in the X direction, per line), in the case where data handwritten over two pages is superimposed and displayed together on the touch screen 31, a number of the corresponding page coordinates is significantly reduced (e.g., halved) due to switching of pages.

Figure 12:
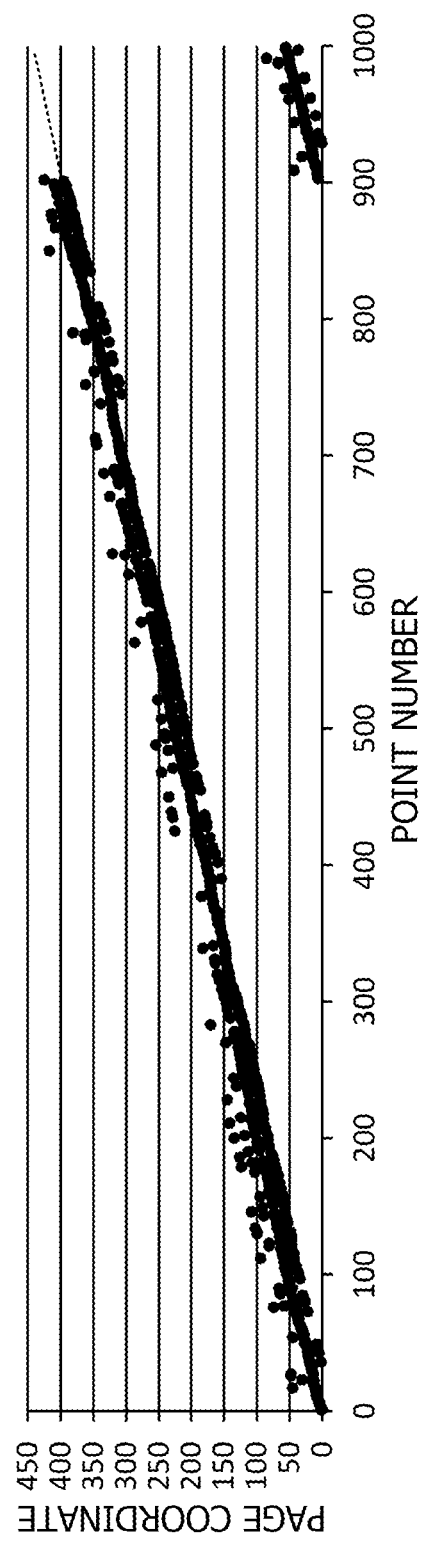
FIG. 12 is a diagram for schematically depicting the relation between the point numbers and the page coordinates with respect to one file including data handwritten over two pages.

FIG. 12 is a diagram for schematically depicting the relation between the point numbers and the page coordinates with respect to one file including data handwritten over two pages. As depicted in the drawing, while the point numbers (1 to 902 in FIG. 12) corresponding to the handwriting on the first page can be approximated to a straight line, the point numbers (903 and later in FIG. 12) corresponding to the handwriting on the second page are plotted at positions significantly deviated from the approximated straight line. Therefore, the control unit 33 according to the second aspect of the present disclosure is configured to obtain a correlation coefficient between the point number and the page coordinate, to determine the presence or absence of page turning on the basis of the obtained correlation coefficient, and to execute a file dividing process according to the determination result. That is, in order to prevent the handwritten input, which should be divided into plural pieces of handwritten data corresponding to plural pages and recorded in plural files respectively, from being recorded instead in one file, the above-described attribute information indicative of page turning, for example, may be used to execute the file dividing process according to the second aspect of the present disclosure.

Figure 13:
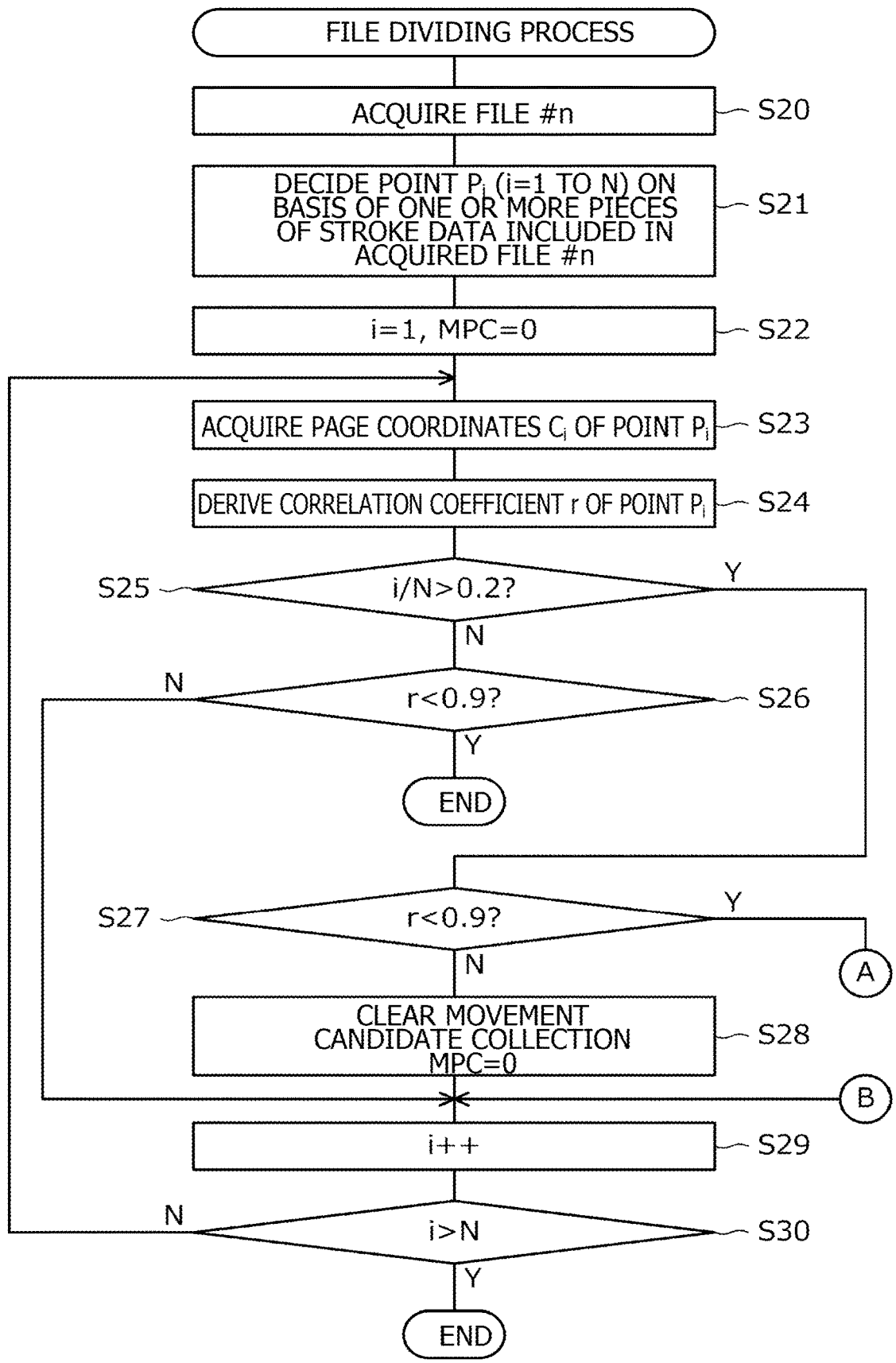
FIG. 13 is a flowchart for depicting a file dividing process according to the second aspect of the present disclosure.
Figure 14:
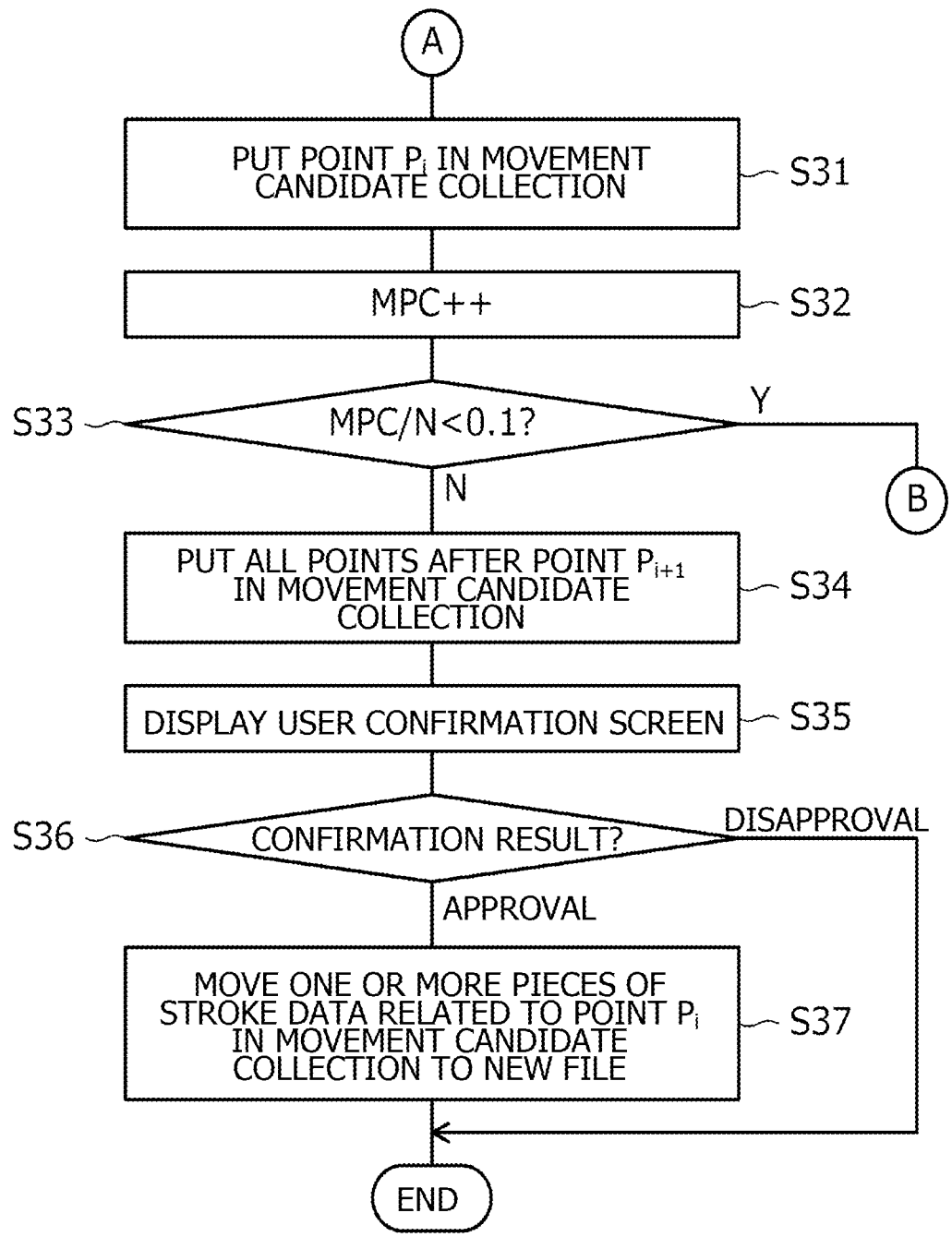
FIG. 14 is a flowchart for depicting the file dividing process according to the second aspect of the present disclosure.

FIG. 13 and FIG. 14 are flowcharts for depicting the file dividing process according to the second aspect of the present disclosure. Hereinafter, the process of the control unit 33 according to the second aspect of the present disclosure will be specifically described with reference to these flowcharts.

The control unit 33 first acquires file #n to be processed (step S20). Subsequently, the control unit 33 determines total N points $P_i$ (i=1 to N) on the basis of one or more pieces of stroke data included in the acquired file #n (step S21). The variable i is the above-described point number. The control unit 33 then assigns 1 to the variable i and 0 to a variable MPC (step S22). The variable MPC is a variable for storing a number of points $P_i$ which are candidate points to be moved to another file in the process to be described below.

Next, the control unit 33 acquires the page coordinate $C_i$ of the point $P_i$ (step S23), and derives the correlation coefficient r of the point $P_1$ by the following Equation (1) (step S24). Note that in Equation (1), $S_{PP}$ is the deviation square sum obtained by Equation (2), $S_{CC}$ is the deviation square sum obtained by Equation (3), and $S_{PC}$ is the deviation product sum obtained by Equation (4). In addition, <P> in Equations (2) and (4) is the average value of the points $P_1$ to $P_i$, and $\langle C \rangle$ in Equations (3) and (4) is the average value of the page coordinates $C_1$ to $C_i$.

$$r = \frac{S_{PC}}{\sqrt{S_{PP}S_{CC}}} \quad (1)$$

$$S_{PP} = \sum_{k=1}^{i}(P_k - \langle P \rangle)^2 \quad (2)$$

$$S_{CC} = \sum_{k=1}^{i}(C_k - \langle C \rangle)^2 \quad (3)$$

$$S_{PC} = \sum_{k=1}^{i}(P_k - \langle P \rangle)(C_k - \langle C \rangle) \quad (4)$$

Next, the control unit 33 determines whether or not the number of points $P_1$ to $P_i$ (=i) exceeds 20% of the total number of points N (i/N>0.2) (step S25). If not, it is determined whether or not the correlation coefficient r derived in step S14 is smaller than 0.9 (step S26), and if it is determined to be smaller, the file dividing process is terminated. According to this processing, in the case where the relation between the point number and the page coordinate clearly does not satisfy the relation depicted in FIG. 12 and therefore it is not appropriate to apply the second aspect of the present disclosure, such as in the case where what is written on the page is not a sentence but a drawing, the file dividing process can be terminated. It should be noted that in the case where the variable i is too small (for example, i/N<0.1), it is conceivable that the value of the correlation coefficient r derived in step S14 is not stable, and thus the determination result in step S26 may be forcibly set to "N" (negative).

In the case where it is determined in step S26 that the correlation coefficient r is not smaller than 0.9, the control unit 33 increments the variable i by 1 (i+1) (step S29), and determines whether or not the variable i is larger than N (step S30). Here, if the variable i is larger than N, the control unit 33 terminates the file dividing process. In this case, the file is not divided. On the other hand, if the variable i is not larger than N, the process continues by returning to step S23.

The control unit 33 having determined that i/N is larger than 0.2 in step S25 then determines whether or not the correlation coefficient r derived in step S14 is smaller than 0.9 (step S26), and in the case where it is determined to be not smaller, the control unit 33 clears a movement candidate collection and assigns 0 to the variable MPC (step S28). The movement candidate collection is a table for temporarily storing the point $P_i$ that has become the movement candidate to be moved to another file. As will be described later, the condition for storing the points $P_i$ in the movement candidate collection is that the correlation coefficient r is smaller than 0.9, but if the correlation coefficient r becomes 0.9 or more at the points $P_i$ thereafter, it is highly likely that the points $P_i$ heretofore stored in the movement candidate collection are outliers that should be ignored. According to the process in step S28, it is possible to exclude the points $P_i$ that are such outliers from the movement candidates. After executing step S28, the control unit 33 moves to step S29 to continue the process.

In the case where it is determined in step 26 that the correlation coefficient r is smaller than 0.9, the control unit 33 enters the point $P_i$ in the movement candidate collection as depicted in FIG. 14 (step S31), and increments the variable MPC by 1 (MPC+1) (step S32). Then, it is determined whether or not the number of points $P_i$ stored in the movement candidate collection (=MPC) is smaller than 10% of the total number of points N (MPC/N<0.1) (step S33). If MPC is determined to be smaller than 10%, the control unit 33 moves to step S29 in FIG. 13 to continue the process.

On the other hand, if MPC is determined to be not smaller than 10% in step S33, the control unit 33 enters all of the point $P_{i+1}$ and subsequent points ($P_{i+2}$, $P_{i+3}$, etc.) in the movement candidate collection (step S34), and displays a user confirmation screen (step S35). The user confirmation screen allows the user to confirm whether or not the file may be divided. In the user confirmation screen, it may be preferable to arrange information to allow the user to identify any stroke data related to one or more points $P_i$ stored in the movement candidate collection. The control unit 33 having displayed the user confirmation screen determines the confirmation result entered on the screen by the user (step S36).

In the case where it is determined in step S36 that the user has approved the file division, the control unit 33 moves the stroke data related to one or more points $P_i$ in the movement candidate collection to a new file (step S37), and terminates the file dividing process. Accordingly, the file is divided into a portion before the user has turned the page and a portion after the user has turned the page. In the case where it is determined in step S36 that the user has disapproved the file division, the control unit 33 terminates the file dividing process without executing step S37.

As described above, according to the function of the tablet terminal 30 according to the second aspect of the present disclosure, since one file storing the results of writing on a plurality of pages of the paper medium can be divided to multiple pages, it is possible to associate the pages of the paper medium with the files storing the handwritten data in a one-to-one correspondence even in the case when the user forgets to press the power supply/operation button 11 to thereby disrupt a one-to-one correspondence between pages of the paper medium and files.

In addition, since the user confirmation is requested in steps S35 and S36, it is possible to prevent the tablet terminal 30 from automatically executing an inappropriate file division process. This is particularly effective in the case where text sentences and figures (drawings) are mixed in the handwriting of the user.

Although the preferred embodiments of the present disclosure have been described above, it is obvious that the present disclosure is not limited to the particular embodiments, and further various embodiments are possible based on the present disclosure.

For example, in the above embodiments, the tablet terminal 30 embodying both the first aspect and the second aspect of the present disclosure has been described, but the tablet terminal 30 may embody only one of the aspects.

In addition, in connection with the first aspect of the present disclosure, the control unit 33 may store predetermined tag information in the memory 17 when entering a sleep mode. By referring to the tag information when returning from the sleep mode, the control unit 33 can recognize that an entry to the sleep mode has occurred in the middle of the writing, to ensure the continuity of a series of handwritten data written in one page of the paper medium.

In addition, the tablet terminal 30 may be configured to always transit from step S24 to step S27 without executing steps S25 and S26 among the processes depicted in FIG. 13. Similarly, the tablet terminal 30 may be configured to always transit from step S34 to step S37 without executing steps S35 and S36 among the processes depicted in FIG. 14.

In addition, the user confirmation process similar to that in steps S35 and S36 of FIG. 14 may be executed before step S11 of FIG. 6. Accordingly, it is possible to prevent the tablet terminal 30 from automatically executing an inappropriate file coupling (combining) process.

The invention claimed is:

1. An information processing device, comprising:
   a storage configured to store handwritten data generated according to handwritten input to a sheet-like recording medium, in the form of a first file corresponding to a first page and a second file corresponding to a second page; and
   a controller configured to be capable of acquiring attribute information of strokes corresponding to the handwritten input related to the first file, and to divide the first file based on the attribute information, wherein
   the controller is configured to obtain a correlation coefficient between the attribute information and a page coordinate, to determine the presence or absence of page turning on the basis of the obtained correlation coefficient, and to execute a file dividing process accordingly.

2. The information processing device according to claim 1, wherein
   the attribute information is information based on a number of the strokes corresponding to the handwritten input.

3. The information processing device according to claim 1, wherein
   the page coordinate is a number indicating a serial number of each cell obtained by dividing one page into a lattice shape.

4. An information processing device comprising:
   a storage configured to store handwritten data generated according to handwritten input to a sheet-like recording medium, in the form of a first file corresponding to a first page and a second file corresponding to a second page; and
   a controller configured to be capable of acquiring attribute information of strokes corresponding to the handwritten input related to the first file, and to divide the first file based on the attribute information, wherein
   the controller is configured to determine whether or not to couple the first filed and the second file on the basis of a positional relation of a region of the first and/or second page(s) in which the handwritten data has been written and/or a region of the first and/or second page in which the handwritten data has not been written.

5. The information processing device according to claim 4, wherein
   the controller is configured to determine whether or not to couple the first file and the second file on the basis of a first identification result generated on the basis of terminal end information of the handwritten data stored in the first file and a second identification result generated on the basis of start end information of the handwritten data stored in the second file.

6. The information processing device according to claim 5, wherein
   the first identification result identifies a region of the first page in which the handwritten data has been written or a region of the first page in which the handwriting data has not been written, the first identification result being based on the handwritten data stored in the first file; and the second identification result identifies a region of the second page in which the handwritten data has been written or a region of the second page in which the handwriting data has not been written, the second identification result being based on the handwritten data stored in the second file.

7. The information processing device according to claim 5, wherein the terminal end information and the start end information include coordinate information generated according to the handwritten input to the sheet-like recording medium.

8. The information processing device according to claim 5, wherein
   the controller is configured to couple the first file and the second file on the basis of the terminal end information and the start end information to generate the handwritten data according to the handwritten input to the sheet-like recording medium.

9. An information processing method executed by an information processing device having a storage configured to store handwritten data generated according to handwritten input to a sheet-like recording medium in the form of a first file corresponding to a first page and a second file corresponding to a second page, the method comprising:
   acquiring attribute information of strokes corresponding to the handwritten input related to the first file;
   obtaining a correction coefficient between the attribute information and a page coordinate;
   determining the presence or absence of page turning on the basis of the obtained correlation coefficient; and
   controlling a file dividing process according to the determination.

10. The information processing method according to claim 9, comprising:
    dividing the first file based on the attribute information.

11. The information processing method according to claim 9, wherein
    the attribute information is information based on a number of the strokes corresponding to the handwritten input.

12. The information processing method according to claim 9, comprising:
    determining whether or not to couple the first file and the second file on the basis of a first identification result identifying a region of the first page in which the handwritten data has been written or a region of the first page in which the handwriting data has not been written, the first identification result being based on the handwritten data stored in the first file, and a second identification result identifying a region of the second page in which the handwritten data has been written or a region of the second page in which the handwriting data has not been written, the second identification result being based on the handwritten data stored in the second file; and
    controlling coupling of the first file and the second file in response to a determination that the first file and the second file are to be coupled.

13. The information processing method according to claim 9, comprising:
    determining whether or not to couple the first file and the second file on the basis of a positional relation of a region of the first and/or second page(s) in which the handwritten data has been written and/or a region of the first and/or second page(s) in which the handwritten data has not been written.

14. The information processing method according to claim 9, comprising:

determining whether or not to couple the first file and the second file on the basis of a first identification result generated on the basis of terminal end information of the handwritten data stored in the first file and a second identification result generated on the basis of start end information of the handwritten data stored in the second file.

15. The information processing method according to claim 14, wherein the terminal end information and the start end information include coordinate information generated according to the handwritten input to the sheet-like recording medium.

16. The information processing method according to claim 14, comprising:

controlling coupling of the first file and the second file on the basis of the terminal end information and the start end information to generate the handwritten data according to the handwritten input to the sheet-like recording medium.

\* \* \* \* \*